(12) United States Patent
Decker et al.

(10) Patent No.: US 7,084,385 B2
(45) Date of Patent: Aug. 1, 2006

(54) RANGE DISCRIMINATING OPTICAL SENSOR HAVING A WIDE ANGLE LENS WITH A FIXED FOCAL LENGTH

(75) Inventors: Stephen W. Decker, Clarkston, MI (US); Bernard DeMersseman, Royal Oaks, MI (US)

(73) Assignee: Autoliv ASP, Inc., Ogden, UT (US)

( * ) Notice: Subject to any disclaimer, the term of this patent is extended or adjusted under 35 U.S.C. 154(b) by 240 days.

(21) Appl. No.: 10/643,812

(22) Filed: Aug. 19, 2003

(65) Prior Publication Data

US 2005/0061949 A1   Mar. 24, 2005

(51) Int. Cl.
*H01L 27/00* (2006.01)

(52) U.S. Cl. .................... 250/208.1; 250/216

(58) Field of Classification Search .......... 250/559.38, 250/559.32, 216, 208.1, 214.1; 359/749–753
See application file for complete search history.

(56) References Cited

U.S. PATENT DOCUMENTS

| | | | | |
|---|---|---|---|---|
| 3,552,854 A | | 1/1971 | Babb et al. ............... 356/4.05 |
| 4,584,704 A | * | 4/1986 | Ferren ....................... 382/255 |
| 5,936,664 A | * | 8/1999 | Fraering et al. ............. 348/84 |
| 6,456,261 B1 | * | 9/2002 | Zhang ........................... 345/8 |
| 6,477,260 B1 | | 11/2002 | Shimomura ................ 382/106 |
| 2002/0085739 A1 | | 7/2002 | Ludwig et al. ............ 382/104 |
| 2002/0135165 A1 | | 9/2002 | Zayan et al. ................ 280/735 |

FOREIGN PATENT DOCUMENTS

| | | |
|---|---|---|
| WO | WO-98/48372 | 10/1998 |
| WO | WO-02/08685 A2 | 1/2002 |
| WO | WO-03/016820 A1 | 2/2003 |

\* cited by examiner

*Primary Examiner*—Georgia Epps
*Assistant Examiner*—Tony Lu
(74) *Attorney, Agent, or Firm*—Sally J Brown

(57) ABSTRACT

A range discriminating optical sensor for use in a vehicle safety system is provided. The range discriminating sensor is designed to create a small depth of field such that objects at a range outside of the depth of field are eliminated from the image. Generally, the optical sensor uses a large aperture to limit the depth of field. An electronic imaging element is used to detect the image projected by the lens. The electronic imaging element may have a small pixel size which further reduces the depth of field. A signal processor can be used to determine the distance from the image sensor with objects with the selected depth of field appearing in focus and those outside of the depth of field appearing out of focus.

32 Claims, 4 Drawing Sheets

RANGE DISCRIMINATING OPTICAL SENSOR HAVING A WIDE ANGLE LENS WITH A FIXED FOCAL LENGTH

BACKGROUND OF THE INVENTION

1. Field of the Invention

The present invention relates to sensors which can be used to activate or otherwise control vehicle safety systems. More specifically, the present invention relates to an optical sensor which can discriminate between objects based upon range from the sensor.

2. Technical Background

Vehicle safety is a significant concern to consumers and manufacturers alike. A number of features have been designed which make automobiles safer to operate. Some of the earliest features designed to make vehicles safer are devices designed to protect the vehicles and their occupants from impact. These devices are passive in nature requiring no action from the driver to activate them. Such safety features include bumpers and reinforced body panels and vehicle frame.

As the design of vehicles has advanced, so have the number and complexity of their safety features. The advent of the seatbelt was a significant advancement in vehicle safety. Seatbelts are generally an active restraint device, requiring the vehicle occupant to correctly fasten and tighten the seatbelt. When seatbelts are properly worn, an occupant's injuries in a crash are generally less severe. Moreover, the seatbelt may assist a driver in avoiding a crash by holding the driver behind the vehicle controls during evasive maneuvering.

Another significant advancement in vehicle safety is the inflatable cushion or airbag. Airbags have become standard equipment on most vehicles sold in the United States, and their installation is required by law for most new vehicles. Airbag modules commonly contain a collision sensor, an inflator, and an airbag cushion. In the event of an accident, a collision sensor such as an accelerometer, measures abnormal deceleration and triggers the inflator by means of an electronic signal. The inflator is generally a pyrotechnic device which produces pressurized gas. The inflator is connected to the airbag cushion and inflates the airbag cushion through an opening in the airbag cushion.

Prior to inflation, the airbag cushions are housed in an uninflated and folded condition to minimize space requirements. Typically the airbag module is housed in the steering wheel on the driver's side of a vehicle and in the dashboard on the passenger side of a vehicle. Upon receipt of the signal from the collision sensor, the inflator rapidly produces a quantity of inflation fluid or gas which inflates the cushion and protects the passenger from harmful impact with the interior of the car.

Unlike seatbelts which require active effort from the occupant to protect, airbags are passive requiring no action on the part of the occupant. Because the airbag is passive, the sensor must be able to detect or anticipate a crash. Thus, in a fraction of a second, a sensor must detect the rapid change in acceleration and send a signal to the inflator to inflate. Generally, this detection begins after the vehicle has already impacted the object.

Airbag cushions are generally installed in the front seating area of a vehicle to protect the driver and passenger from impact with the windshield, the steering column, and the instrument panel. The inflating airbag cushions protect an occupant by rapidly inflating. The force of the inflation must be sufficiently strong to counteract the force of the occupant being thrown forward. Accordingly the larger the occupant, the stronger the force required to protect the occupant.

Because adults are the most common occupants of the front seats, many airbag cushions have been designed to inflate with a force to protect the typical adult. However, the actual occupant may be much larger or smaller than the typical adult. Thus, if a child or small adult is seated in the front seat the force of the inflating airbag may be too large for optimal protection. Likewise if a large person is seated in the front seat the force of the inflating airbag may be insufficient for optimal protection of the occupant.

Recently, "smart" airbags have been developed that can inflate with a variable force depending on the mass of the occupant to be protected. Thus, such smart airbags can be configured to inflate with the appropriate force to optimally protect the actual occupant of a front seat. Key to this proper inflation is the detection of the size of the occupant in the seat. Currently available detectors may use a sensor to detect the weight of the person in the seat. However, such sensors may not take into account such factors that may add to weight detected, such as a child safety seat, without indicating the actual size of the occupant.

Seatbelts and airbag cushions are generally designed to protect occupants of a vehicle from an impact. Other Safety systems have been designed which can assist a driver in avoiding an impact, or protect occupants of another vehicle from an impact. Such devices include warning systems that indicate that an object is close to the front, side, rear of a vehicle. Thus a driver may be assisted in avoiding a pedestrian, a vehicle, or another object.

Other safety devices may be designed to lessen the impact to another vehicle or damage to the subject vehicle. One such device is a configured to dip the nose of the car prior to an impact. Such dipping, particularly when installed on a vehicle with high ground clearance, may assist the vehicles in aligning bumpers and prevent damage to the smaller vehicle caused by the bumper of the large vehicle.

Airbags and these newer safety devices all require a sensor that can detect a crash sufficiently early to allow for activation of the safety feature. In some cases the nature of the device dictates that the sensor detects the crash before it actually occurs. In yet other instances, such as lane change and back-up warning systems, the sensor must detect the mere possibility of an accident and warn the driver of the risk of a collision.

Recently, optical sensors or vision systems have been developed to rapidly detect a collision. Additionally, such optical sensors can also be used to assess the risk of a collision and warn the driver to take appropriate measures.

For a vision system to function properly, it must be able to discriminate between objects near the sensor and objects further away. If an optical sensor cannot discriminate based on the range of the object, objects that are distant from the sensor may be determined to be important causing the sensor to give a false positive result. Vision systems that can discriminate on the basis of range from the sensor are commonly made in two ways. The first is the use of stereo cameras. With two cameras, the disparity measurements between the two images in the two cameras can be used to determine the distance from the sensor. Because this system uses two cameras and electronic image processing elements, the cost of manufacture can be relatively high. Additionally, the risk of system malfunction is also increased.

The second way commonly used in vision systems to discriminate based on range uses one camera. The sensor uses structured or structurless light added to the image in a controlled way. Such light can be emitted by a light source adjacent the sensor. The light is then reflected off an object of interest and then detected by the camera. By analyzing the size and other characteristics of the reflected light, the sensor can determine the distance of the object. Because this system requires the use of some type of light projector, the cost of the system may also be quite high. Additionally, the projection and reflection of light may not function adequately in direct sunlight and with certain types of surfaces.

Accordingly, a need exists for a sensor which can rapidly detect an immient vehicle impact and activate a vehicle safety feature. It would be an additional advancement in the art to provide a sensor which can assess the risk of an impact prior to an accident. It would be a further benefit if the sensor could discriminate between object based upon the distance from the sensor. It would be an additional advancement to present an optical sensor which could detect the distance from the sensor while using a single digital camera. It would be further benefit if the optical sensor would function without the addition of light. It would be an additional advancement to provide a sensor that could discriminate between an occupant of a front seat and an occupant of a rear seat of a vehicle.

SUMMARY OF THE INVENTION

The apparatus of the present invention has been developed in response to the present state of the art, and in particular, in response to the problems and needs in the art that have not yet been fully solved by currently available optical sensors for vehicle safety systems. Thus, the present invention provides an optical sensor. The depth discriminating optical sensor can be used to activate or otherwise control a vehicle safety device. Such vehicle safety devices may include an airbag cushion, a secondary bumper, an ignition, a restraint system, a braking system, and the like.

Generally, the depth discriminating optical sensor uses an electronic imaging element with a small pixel size and a wide angle lens and a large aperture. The combination of the small pixel size and the large aperture creates a depth of field that is quite limited. This limited field of view blurs objects that are too close or too far away from the optical sensor such that only objects within a preselected range are in focus.

The image can be projected onto an electronic imaging element. The pixel size of the electronic imaging element can be selected to be quite small. A small pixel size increases the resolution of the sensor while at the same time enhancing the blurring of objects outside desired depth of field. The pixel size may depend on a number of parameters including the use of the sensor and the cost of the electronic imaging element. In most instances an electronic imaging element with a pixel size in the range from about 2 µm to about 6 µm will allow for proper recognition of objects. Alternatively, the electronic imaging element may have a pixel size in the range from about 3 µm to about 5 µm. In one presently preferred embodiment, the electronic imaging element has a pixel size of about 3 µm.

The wide angle lens used in the depth discriminating optical sensor has a focal length selected according to the desired use of the optical sensor. A wide angle lens having a focal length in the range from about 2 mm to about 14 mm may be used for most uses. In other embodiments the focal length of the wide angle lens may be in the range from about 5 mm to about 10 mm. For example, in one presently preferred embodiment, the wide angle lens has a focal length of about 8 mm.

Another feature of the invention that allows for depth discrimination is the use of a large aperture. Generally an aperture with an f-stop number in the range from about 1.2 to about 1.8 will create the desired effect. In other embodiments the aperture may have an f-stop number in the range from about 1.2 to about 1.5. For example in one presently preferred embodiment the aperture is about 1.2.

The depth discrimination optical sensor of the present invention is designed such that objects at a preselected distance from the sensor are in focus. Also, the depth of field of the optical sensor will vary depending on use of the sensor. For example when the optical sensor is used to detect objects outside of the vehicle, a larger depth of field may be desired, however when the object to be detected is located within the vehicle a much smaller depth of field may be required. For example a rear depth of field in the range from about 0.1 m to about 3.0 m will provide for proper discrimination of objects in most instances. In one presently preferred embodiment, the rear depth of field is about 1.2 m.

The optical sensor can be configured to detect an object at a given distance from the sensor. This distance can be varied by changing the parameters of the sensor such as focal length, aperture size, and pixel size. This distance will also depend on whether the object to be detected is within the vehicle or external to the vehicle. For example, in certain configurations of the range discriminating sensor, an object at a distance from the sensor in the range from about 0.1 m to about 2.0 m is in focus. Alternatively, in other configurations an object at a distance from the sensor in the range from about 1.0 m to about 6.0 m may be in focus.

The design of the optical sensor with a large aperture and small pixel size creates a view with a short depth of field where objects in the foreground are in focus and objects in the background are blurred. A signal processor can be used to interpret this data. Because the objects outside of the depth of field are blurred, the signal processor can discriminate objects from the foreground and background of the view. Therefore, only objects in the foreground, which may present actual threats to the vehicle, are processed as potential threats to the vehicle by the algorithms of the signal processor. Moreover, other characteristics of the object such as velocity and size may also be determined by the signal processor. In this manner, the signal processor may determine that a vehicle safety feature should be activated or otherwise controlled.

These and other features and advantages of the present invention will become more fully apparent from the following description and appended claims, or may be learned by the practice of the invention as set forth hereinafter.

BRIEF DESCRIPTION OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
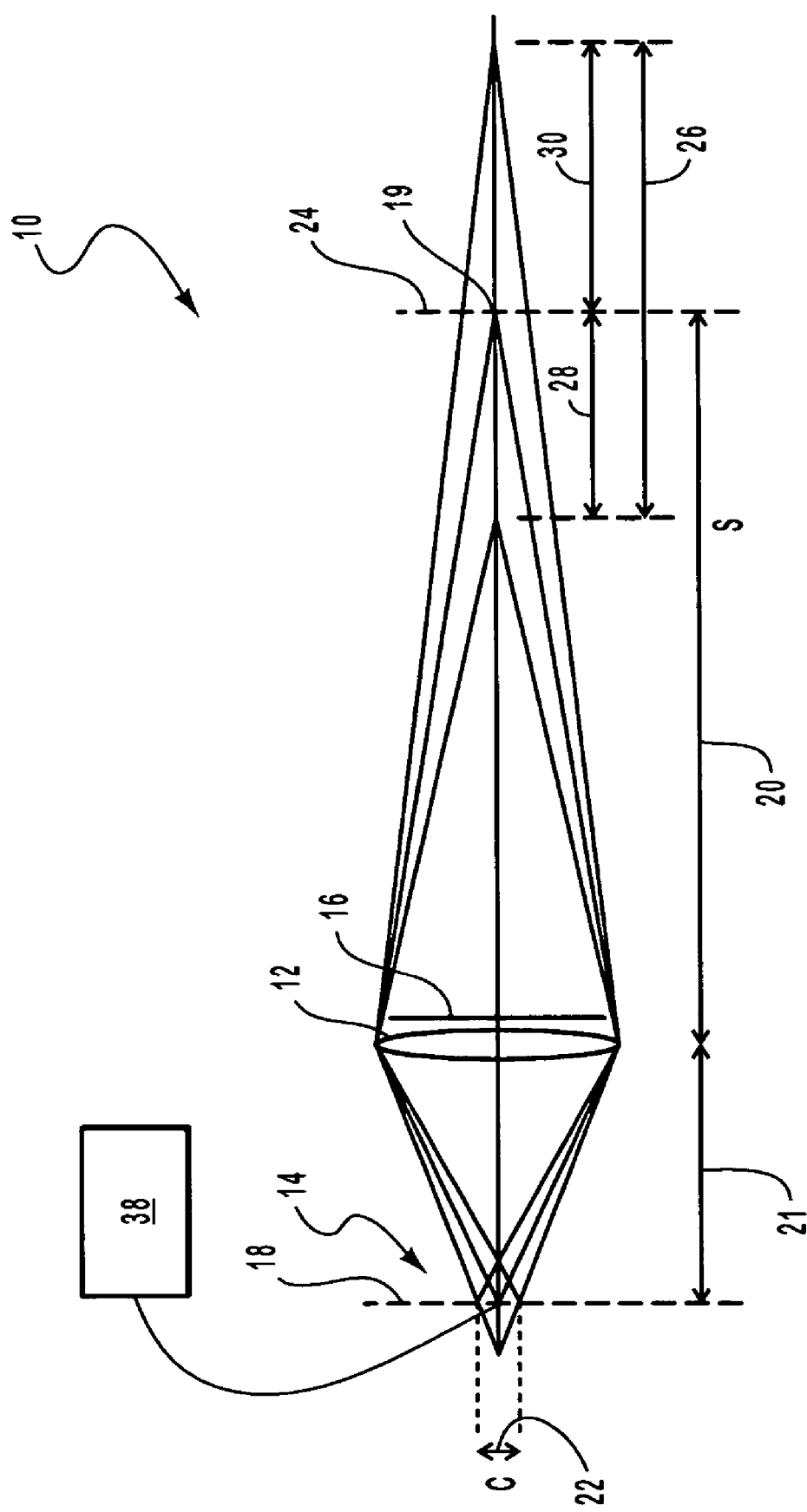
FIG. 1 is a ray diagram illustrating an optical sensor of the present invention.

Referring to FIG. 1, a schematic ray diagram illustrating a range discriminating optical sensor 10 of the present invention is shown. The optical sensor 10 can discriminate objects in the image based on their relative range from the lens 12 of the optical sensor 10. This range discrimination can be accomplished with only one optical sensor and the use of signal processing algorithms. The sensor 10 of the present invention can discriminate on the basis or range or distance from the lens 12 of the sensor 10 without the use of controlled light or more complex methods which add to the cost and risk of malfunction of a sensor.

The sensor 10 has an electronic imaging element 14 and wide angle lens 12 with a large aperture 16. The lens 12 is positioned such that an object at the focus point 19 will be projected onto the image screen 18. The electronic imaging element 14 generates an electronic image 18 with a pixel size "c" 22.

With all lenses, an object 24 at the focus point 19 will be the sharpest thing in the image. However, image sharpness does not suddenly disappear for an object just in front or behind of the focus point 19. The focus point 19 is predetermined in the design of the system to be at a distance 20 from the lens 12. Points closer or farther away than the focus point 19 will be less sharp, but will appear acceptably sharp throughout the depth of field 26. The depth of field 26 is the distance in front or behind the focus point 19 at which the image will appear acceptably sharp.

The depth of field (DOF) 26 can be divided into two parts, the front depth of field 28 and the rear depth of field 30. The front DOF 28 is the distance in front of the focus point 19 at which the image will appear acceptably sharp in the imaging element 14. Likewise, the rear DOF is the distance beyond the focus point 19 at which the image will appear acceptably sharp.

In most lens systems it is desirable to have a large depth of field. For example, with a camera, a crisp image is easier to obtain when the depth of field is large. Additionally, optical sensors generally employ a design that provides a large depth of field so that objects at a variety of distances can be tracked. However, with a sensor using a large depth of field, the objects distant from the sensor can interfere with the proper functioning of the safety system.

The optical sensor 10 of the present invention is designed so that the depth of field 26 is limited. A short depth of field 26 would be considered to be bad design for most vision systems. However, for the sensor 10 of the present invention this is the desired effect of the design. Such a system prevents objects outside of the depth of field 26 from interfering with the sensing system. Moreover, this wide-open design improves the sensitivity of the sensor, which is a side benefit of this approach.

Because the distance 20 between the lens 12 and an object 24 at the focus point 19 is very large compared to the focal length of the lens 12, the rear depth of field can be approximated with Formula 1. In Formula 1, the rear DOF can be approximated using the pixel size "c," the f-stop number of the aperture "N," the distance from the lens to the object "S," and the focal length "f" of the lens. The f-stop number equals the focal length of the lens divided by the limiting diameter of the aperture.

$$\text{Rear } DOF = \frac{cNS^2}{f^2 - cNS}. \qquad \text{Formula 1}$$

In the present vision system, the distance from the lens 12 to the focus point 19 will be predetermined depending on the intended use of the optical sensor. For example, when the sensor is used to detect objects outside of a vehicle, S will be quite large and be in the range from about 1 m to about 6 m. However, when the sensor is used to detect objects within the vehicle, S will be quite small and in the range from about 0.1 m to about 2 m. Thus, the rear DOF of the vision sensor 10 may be decreased by reducing the pixel size "c" or decreasing the f-stop number "N."

The distance of the focus point 19 is predetermined by the intended use of the sensor. Because the distance to the focus point 19 is very large compared to the focal length of the lens 12, the aperture can be as large as possible to decrease the rear DOF 26. Generally an aperture with an f-stop number in the range from about 1.2 to about 1.8 will create the desired effect. In other embodiments the aperture may have an f-stop number in the range from about 1.2 to about 1.5. For example, in one presently preferred embodiment the aperture is about 1.2.

It will be appreciated, that the pixel size 22 of the imaging element can be varied depending on cost and available technology. In most instances an electronic imaging element with a pixel size in the range from about 2 μm to about 6 μm will allow for proper recognition of objects. Alternatively, the electronic imaging element may have a pixel size in the range from about 3 μm to about 5 μm. In one presently preferred embodiment, the electronic imaging element has a pixel size of about 3 μm.

The wide angle lens 12 used can have a range of focal lengths and still provide a system wherein the rear DOF is small. A wide angle lens 12 having a focal length in the range from about 2 mm to about 14 mm may be used for most uses. In other embodiments the focal length of the wide angle lens 12 may be in the range from about 5 mm to about 10 mm. For example in one presently preferred embodiment, the wide angle lens 12 has a focal length of about 8 mm.

In one embodiment of the invention the distance 20 of the focus point 19 is set at 4 meters. An object 24 at that distance 19 will be in focus upon the image screen 18 of the electronic imaging element 18. Using an imaging element 18 with a small pixel size 22 such as 3 μm and a large aperture 16 with an f-stop number of 1.2, the rear DOF will be about 1.16 m. An object 24 that is at the focus point 19 or at a point within the about 1.16 m of the rear DOF will appear in focus on the electronic imaging element 14. Thus, an object that is further away from the sensor than the focus point of about 4 meters plus the rear the rear DOF of 1.16 meters will appear out of focus to the image processor 38.

Such out of focus objects will be eliminated for from the signal processor's consideration and will not interfere with the proper function of the sensor 10.

A signal processor 38 is connected to the electronic imaging element 14 for processing the image of the vision system 10. The signal processor 38 can be a microprocessor programmed to with an algorithm that determines the sharpness of a given object within the image projected on the image element 14. Such signal processors with such algorithms are generally used in the autofocusing elements of cameras and other optical devices.

In an autofocusing optical device, the signal processor is configured to determine the outline and sharpness of each object in image. If an object of interest, which is generally in the center of a frame, is determined to be blurry by the signal processing algorithm, the camera adjusts the focus to bring the image into focus.

The signal processor of the instant case works in a similar manner. The signal processor uses an algorithm which determines the outline and sharpness of each image in the field of view. Thus, the signal processor 38 can be used to determine the sharpness of any object in the projected image. However, if an object is determined to be blurred the sensor will not adjust the focus of the system. Objects that are determined to be out of focus by the signal processing 38 are outside of the DOF 26 of the sensor 10. The sensor 10 therefore discriminates between objects close to the sensor and objects far away from the sensor. Those objects that are too distant from the sensor to present a potential risk or are otherwise not of interest, appear blurry and are disregarded by the sensor.

The rear DOF could also be advantageously reduced by tilting the lens. Such tilting of the lens may distort the image. The distortion of the image could be compensated by signal processing if necessary.

In certain embodiments, the field of view may need to be increased. The field of view is the height and width at which an object is viewable to the lens. The field of view can be increased by an arrangement of mirrors and prisms if the focal length does not allow for a sufficient field of view. Such arrangement of mirrors and prisms are known in the art.

Figure 2:
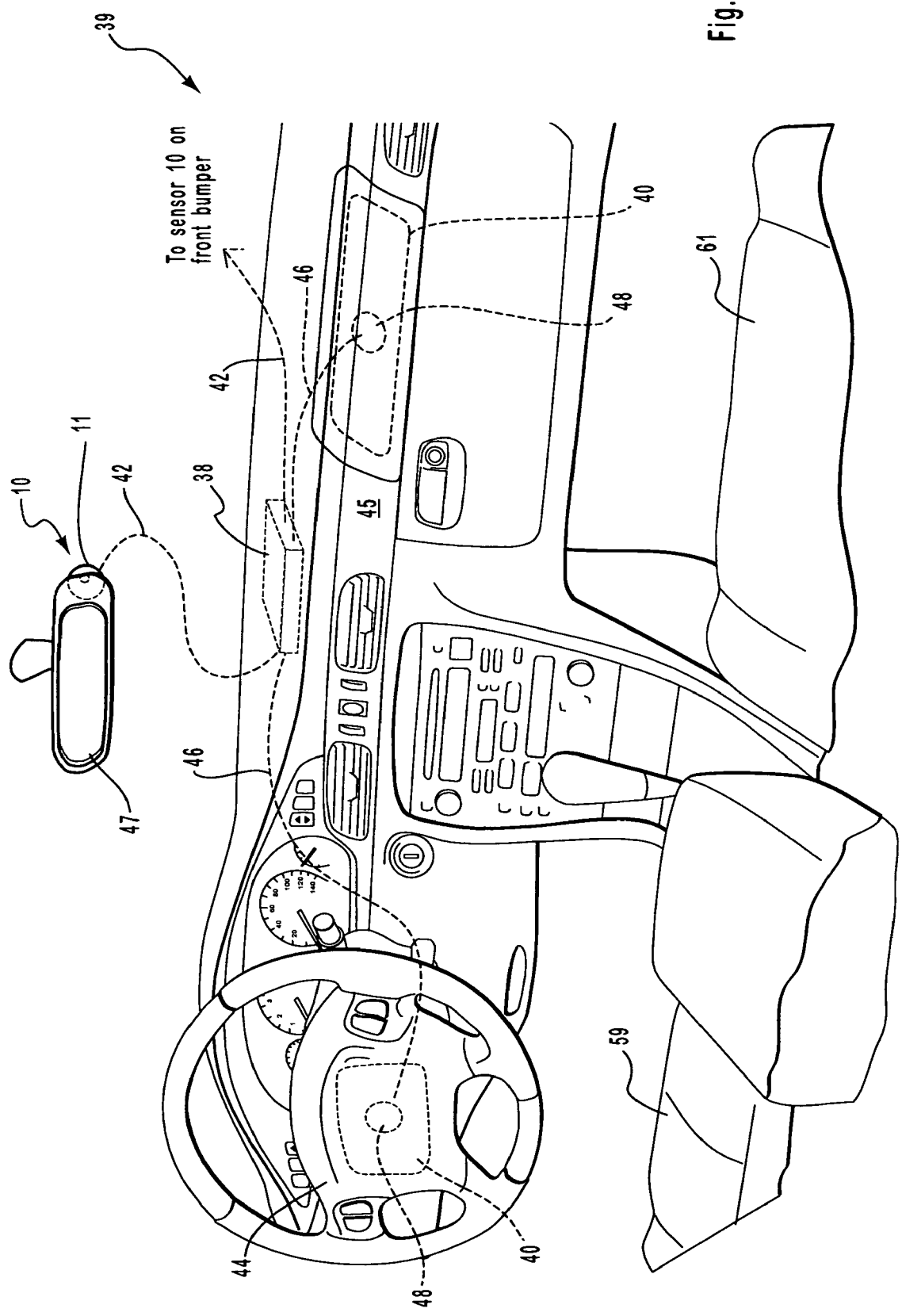
FIG. 2 is a cutaway perspective view of a front seating area of a vehicle showing an installed optical sensor.

Referring now to FIG. 2, the front seating area 39 of a vehicle is shown. The front seating area has a steering column 44 and an instrument panel 45. A rearview mirror 47 is provided near the center of the seating area 39.

Airbags 40 are positioned in the steering columns 44 and the instrument panel 45. These airbags 40 are configured to inflate and protect occupants of the driver's seat and the passenger's seat respectively. The optical sensor 10 of the present invention can be positioned on the front bumper or the rear view mirror 47.

The optical sensor 10 can be positioned to detect an impact that requires the inflation of the airbags 40. The camera 11, which includes the wide angle lens with a large aperture and the electronic imaging element, is positioned to detect a vehicle or other object at the focal point and within the depth of field.

The image from the camera 11 is conveyed to the signal processor by lines 42. If the signal processor 38 detects an object at the focus point, or within the depth of field, approaching the vehicle at a rate that is indicates an imminent collision, the processor sends a signal to inflators 48 though lines 46. The activated inflators 48 infuse pressurize inflation gas into the airbags 40. However, if an object is outside of the depth of field, the object appears blurry within the image, and the signal processor can determine that the object does not present a risk to the vehicle. Thus, when an object is outside of the short depth of field of the sensor 10, the signal processor disregards the blurry object in the image and does not signal the airbags to inflate.

Figure 3:
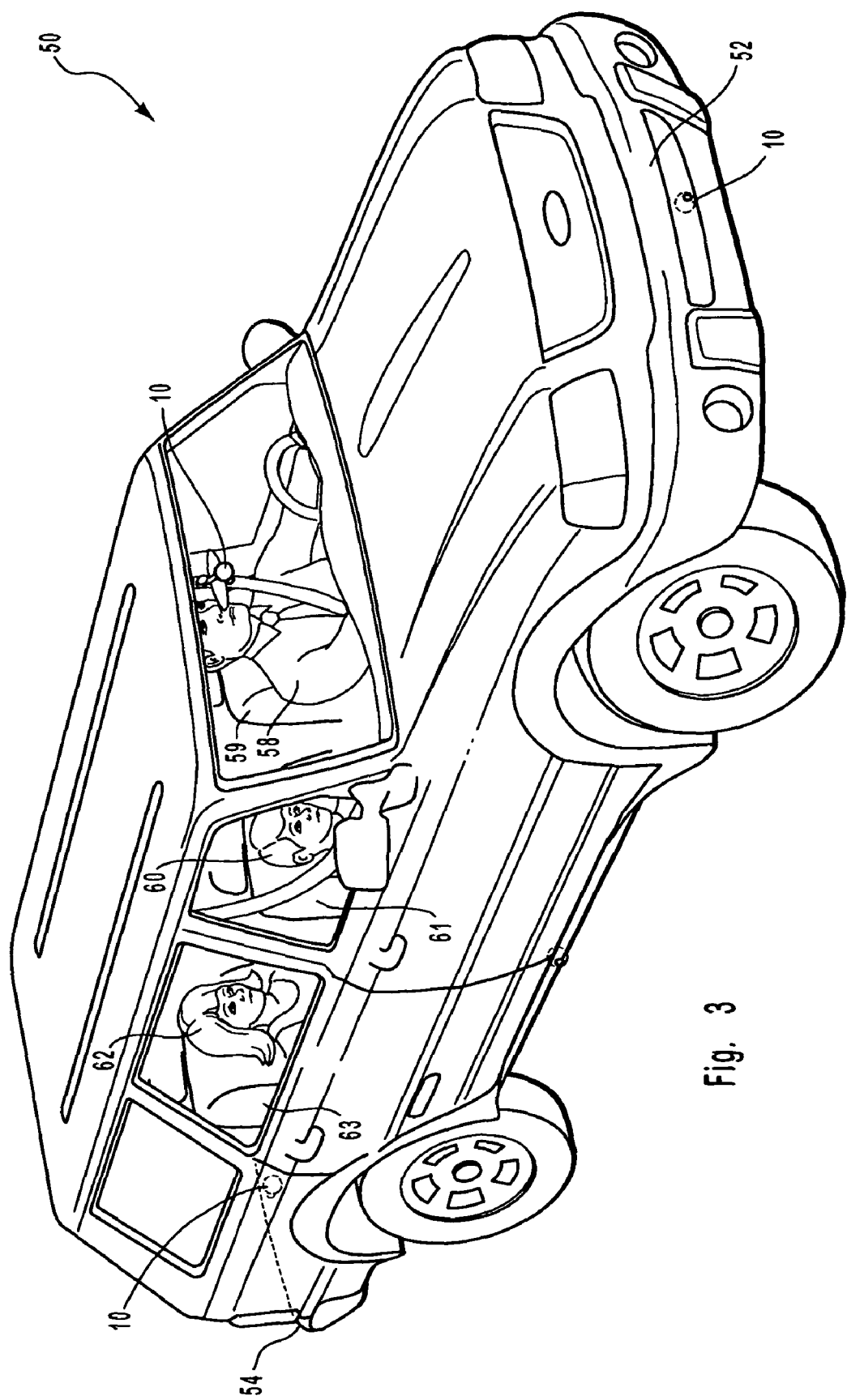
FIG. 3 is perspective view of a vehicle with an installed optical sensor.

Referring now to FIG. 3, a vehicle 50 is shown with a number of range discriminating optical sensors 10 positioned at a variety of positions. For example, an optical sensor 10 may be positioned on the front end 52 of the vehicle. A sensor 10 within the front 52 of the vehicle can be positioned to detect object that may collide with the front of the vehicle and then activate a vehicle safety device. Such safety devices can include the lowering of a front end of the vehicle prior to impact. Such lowering may be accomplished by the controlled releasing pressure from the suspension system. Alternatively, hydraulics may be used to lower the front end. With the front end 52 lowered, the bumper 53 of the vehicle 50 may be more aligned with the vehicle of a smaller vehicle. Additionally, the lowering of the vehicle can reduce the vehicle profile thereby limiting the risk of rollover.

The fontal sensor 10 may also be used to activate other safety devices. Such devices include secondary bumpers which are activated to cushion the blow to the subject vehicle 50 and the impacted vehicle. Other devices may include automatic braking systems which assist the driver in avoiding a collision. As discussed previously, the sensor 10 may be used to activate airbag cushions. The sensor 10 used in conjunction with an accelerometer may reduce the risk of the airbag cushion being inflate without need.

The sensor 10 may also be positioned on a side 52 of the vehicle. Such sensors may detect objects that are within the depth of field on the side of the vehicle. A particular use for such a side sensor is to warn a driver 58 of a vehicle or other adjacent object which may pose a risk during a lane change or other turning maneuver. Additionally, the sensor 10 on the side of the vehicle may be used to activate side impact airbags or inflatable curtains when the sensor 10 detects an imminent collision.

Another sensor 54 may be positioned at the rear of the vehicle 54. Such a sensor may be of particular use to detect an object behind a vehicle when backing. Only objects, that are at the focus point or within the depth of field of the lens system will be detected by the sensor. Therefore, only object that may actually be hit by the backing vehicle will be detected. Thus, the driver 58 may be alerted to the object and stop the backing or otherwise avoid the object.

A sensor 10 within the cabin of the vehicle can be used to determine the type of occupant within a seat. For example, a sensor 10 positioned on the rearview mirror 47 can view the occupant of the driver's seat 59 and the front passenger's seat 61. With a typical optical sensor, the passenger 62 in the rear seat 63 may also be detected by the sensor 10. However, the wide-open design of the optical sensor of the present invention can discriminate between the passenger 60 in the front seat and the passenger in the rear seat based on the distance from the sensor 10. The depth of field of the optical sensor 10 can be configured such that only passengers in the front seat will be in focus. Therefore, the signal processor can distinguish a child seated in the front seat 61 from a child in the rear seat 63 because the image of a child in the rear seat will be blurred.

The optical sensor 10 can be configured to determine the size of a passenger in either of the front seats 59, 61. When a child or small adult 60 is seated in the front passenger seat 61, the signal processor 38 can produce a signal which reduces the force of inflation of the airbag cushion. Moreover, in certain instances when the child 60 is an infant, the signal processor can detect such an infant and completely shut of the airbag inflator. Additionally, if a child is seated in the driver's seat 59, the signal processor may produce a signal preventing the car from being started. It will be appreciated that without the range discriminating design of the present invention, an optical sensor may mistake a child 62 in the rear seat 63 for a child in the front seats 59, 61 and cause the airbags or ignition to malfunction. However, if any object including a child in the background of the view (outside of the short depth of field) the object will be blurry and can be eliminated from consideration by the algorithms of the signal processor.

Figure 4:
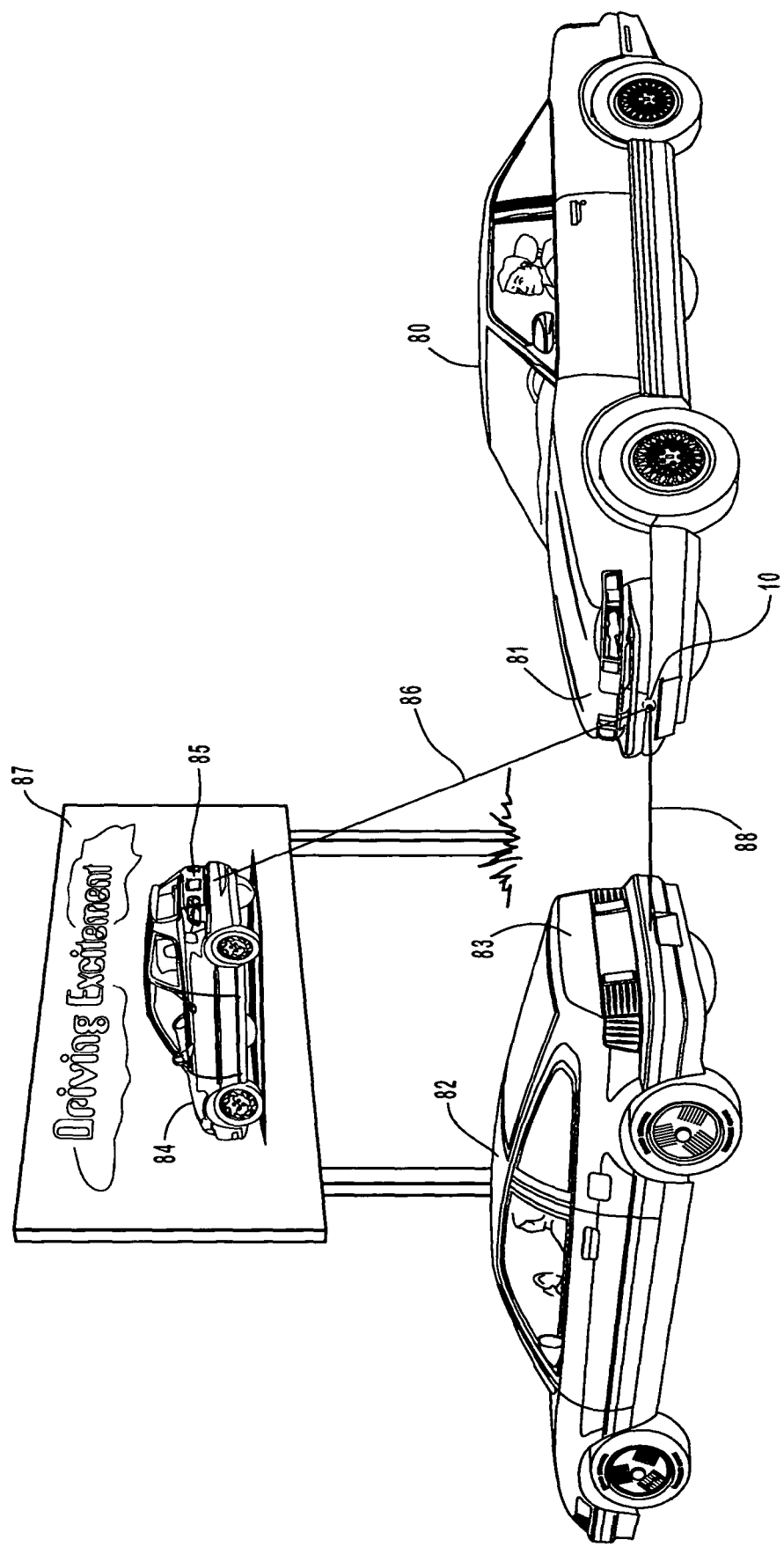
FIG. 4 is a perspective view illustrating the use of the optical sensor of the present invention.

Referring now to FIG. 4 a vehicle 80 is shown with a sensor 10 of the present invention installed within the front end 81. The sensor is configured to have a depth of field that is limited to a few meters. Thus, the sensor 10 may be configured to have a focus point at a distance of about 2 meters from the lens. With a rear depth of field of about 1.5 meters, the rear of a second vehicle 82 at a distance 88 of about 3 meters in front of the sensor 10 will be in focus.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

With a typical optical sensor, an image such the picture of a vehicle 84 on a billboard 87 may be mistakenly detected as a vehicle that may cause an impact. Because the image on the billboard is large, it may appear to a typical sensor as a vehicle close to the sensor. Such improper identification of an object may result in a safety system like an airbag being mistakenly activated. However, the rear 85 of the vehicle 84 on the billboard 87 is at a distance 86 much greater limits of the depth of field of the sensor 10 of the present invention. Thus, the image of the vehicle 87 will not be in focus and can be disregarded by the signal processor.

We claim:

1. A depth discriminating sensor for a vehicle safety device comprising:
   a wide angle lens having an aperture having an f-stop number and having a fixed focal length;
   an electronic imaging element having a pixel size;
   the f-stop number and the pixel size jointly selected to create a rear depth of field in the range from about 0 m to about 3 m; and
   a signal processor configured to discriminate between objects in the depth of field and out of the depth of field based on image sharpness and blur.

2. The depth discriminating sensor of claim 1, wherein the f-stop number of the aperture is in the range from about 1.2 to about 1.8.

3. The depth discriminating sensor of claim 1, wherein the f-stop number of the aperture is in the range from about 1.2 to about 1.5.

4. The depth discriminating sensor of claim 1, wherein the f-stop number of the aperture is about 1.2.

5. The depth discriminating sensor of claim 1, wherein the wide angle lens has a focal length in the range about 3 mm and to about 14 mm.

6. The depth discriminating sensor of claim 1, wherein the wide angle lens has a focal length in the range from about 5 mm to about 10 mm.

7. The depth discriminating sensor of claim 1, wherein the wide angle lens has a focal length of about 8 mm.

8. The depth discriminating sensor of claim 1, wherein the rear depth of field is about 1.2 m.

9. The depth discriminating sensor of claim 1, wherein the electronic imaging element has a pixel size in the range from about 2 μm to about 6 μm.

10. The depth discriminating sensor of claim 1, wherein the electronic imaging element has a pixel size in the range from about 3 μm to about 5 μm.

11. The depth discriminating sensor of claim 1, wherein the electronic imaging element has a pixel size of about 3 μm.

12. The depth discriminating sensor of claim 1, wherein an object at a distance from the sensor in the range from about 0.1 m to about 2.0 m is in focus.

13. The depth discriminating sensor of claim 1, wherein an object at a distance from the sensor in the range from about 1.0 m to about 6.0 m is in focus.

14. A depth discriminating sensor for a vehicle safety device comprising:
   a wide angle lens having an aperture having an f-stop number in the range from about 1.2 to about 1.8 and having a fixed focal length;
   an electronic imaging element having a pixel size in the range from about 2 μm to about 6 μm;
   the f-stop number and the pixel size jointly selected to create a rear depth of field in the range from about 0.m to about 3 m; and
   a signal processor configured to discriminate between objects in the depth of field and out of the depth of field based on image sharpness and blur.

15. The depth discriminating sensor of claim 14, wherein the f-stop number is in the range from about 1.2 to about 1.5.

16. The depth discriminating sensor of claim 14, wherein the f-stop number of the aperture is about 1.2.

17. The depth discriminating sensor of claim 14, wherein the wide angle lens has a focal length in the range from about 3 mm to about 14 mm.

18. The depth discriminating sensor of claim 14, wherein the wide angle lens has a focal length in the range from about 5 mm to about 10 mm.

19. The depth discriminating sensor of claim 14, wherein the rear depth of field is about 1.2 m.

20. The depth discriminating sensor of claim 14, wherein the electronic imaging element has a pixel size in the range from about 3 μm to about 5 μm.

21. The depth discriminating sensor of claim 14, wherein the electronic imaging element has a pixel size of about 3 μm.

22. The depth discriminating sensor of claim 14, wherein an object at a distance from the sensor in the range from about 0.1 m to about 2.0 m is in focus.

23. The depth discriminating sensor of claim 14, wherein an object at a distance from the sensor in the range from about 1.0 m to about 6.0 m is in focus.

24. A depth discriminating optical sensor for a vehicle safety device comprising:
   a wide angle lens having a focal length in the range from about 3 mm and about 14 mm number and having a fixed focal length;
   an aperture having an f-stop number in the range from about 1.2 to about 1.5;
   an electronic imaging element having a pixel size in the range from about 2 μm to about 6 μm;

the f-stop number and the pixel size jointly selected to create a rear depth of field in the range from about 0.1 m to about 3 m; and a signal processor configured to discriminate between objects in the depth of field and out of the depth of field based on image sharpness and blur.

25. The depth discriminating sensor of claim 24, wherein the aperture is about 1.2.

26. The depth discriminating sensor of claim 24, wherein the wide angle lens has a focal length in the range from about 5 mm to about 10 mm.

27. The depth discriminating sensor of claim 24, wherein the wide angle lens has a focal length of about 8 mm.

28. The depth discriminating sensor of claim 24, wherein the rear depth of field is about 1.16 m.

29. The depth discriminating sensor of claim 24, wherein the electronic imaging element has a pixel size in the range from about 3 µm to about 5 µm.

30. The depth discriminating sensor of claim 24, wherein the electronic imaging element has a pixel size of about 3 µm.

31. The depth discriminating sensor of claim 24, wherein an object at a distance from the sensor in the range from about 0.1 µm to about 2.0 m is in focus.

32. The depth discriminating sensor of claim 24, wherein an object at a distance from the sensor in the range from about 1.0 m to about 6.0 m is in focus.

* * * * *

UNITED STATES PATENT AND TRADEMARK OFFICE
CERTIFICATE OF CORRECTION

| | | |
|---|---|---|
| PATENT NO. | : 7,084,385 B2 | Page 1 of 1 |
| APPLICATION NO. | : 10/643812 | |
| DATED | : August 1, 2006 | |
| INVENTOR(S) | : Stephen W. Decker et al. | |

It is certified that error appears in the above-identified patent and that said Letters Patent is hereby corrected as shown below:

Column 7, line 1, please delete "will be eliminated for from the" and replace it with --will be eliminated from the--.

Column 9, lines 31 - 41, please move to begin at line 21.

Column 9, line 49, please delete "about 0 m" and replace it with --about 0.1 m--.

Column 10, line 19, please delete "about 1 .0 m" and replace it with --about 1.0 m--.

Column 10, line 29, please delete "about 0.m" and replace it with --0.1 m--.

Signed and Sealed this

Sixth Day of March, 2007

JON W. DUDAS
*Director of the United States Patent and Trademark Office*